(12) United States Patent
Yang et al.

(10) Patent No.: US 10,630,530 B2
(45) Date of Patent: Apr. 21, 2020

(54) CACHE METHOD, CACHE EDGE SERVER, CACHE CORE SERVER, AND CACHE SYSTEM

(71) Applicant: HUAWEI TECHNOLOGIES CO., LTD., Shenzhen, Guangdong (CN)

(72) Inventors: Zanfeng Yang, Shenzhen (CN); Tao Song, Shenzhen (CN); Xinyu Ge, Nanjing (CN); Pinhua Zhao, Nanjing (CN); Jianzhong Yu, Nanjing (CN); Bo Zhou, Nanjing (CN); Wentao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 15/632,377

(22) Filed: Jun. 25, 2017

(65) Prior Publication Data
US 2017/0295052 A1 Oct. 12, 2017

Related U.S. Application Data

(63) Continuation of application No. PCT/CN2015/096975, filed on Dec. 10, 2015.

(30) Foreign Application Priority Data

Dec. 31, 2014 (CN) .......................... 2014 1 0856429

(51) Int. Cl.
*H04L 29/08* (2006.01)
*G06F 16/957* (2019.01)
(Continued)

(52) U.S. Cl.
CPC .... *H04L 29/08801* (2013.01); *G06F 16/9574* (2019.01); *H04L 29/08* (2013.01);
(Continued)

(58) Field of Classification Search
CPC ......... H04W 36/0005; H04W 36/0011; H04W 36/0016; H04L 67/28; H04L 67/2842;
(Continued)

(56) References Cited

U.S. PATENT DOCUMENTS 9,094,464 B1 * 7/2015 Scharber ............... H04L 45/026
9,338,192 B1 * 5/2016 He ....................... H04L 65/1069
(Continued)

FOREIGN PATENT DOCUMENTS

CN            1531303 A    9/2004
CN          102739712 A   10/2012
(Continued)

*Primary Examiner* — Jeong S Park
(74) *Attorney, Agent, or Firm* — Huawei Technologies Co., Ltd.

(57) ABSTRACT

Embodiments of the present application provide a cache method, the cache method includes: receiving, from the cache core server, information about a Transmission Control Protocol (TCP) flow; determining, according to the information, whether the cache edge server stores content corresponding to the information; sending a migrate-out request to the cache core server based on that the cache edge server stores the content corresponding to the information; receiving a migrate-out response from the cache core server upon the sending of the migrate-out request; performing a TCP connection to user equipment according to the migrate-out response; and reading content corresponding to the connection from storage of the cache edge server according to a byte quantity, sent by the cache core server, of the content, and sending the content to the user equipment.

6 Claims, 9 Drawing Sheets

(51) Int. Cl.
*G06F 16/00* (2019.01)
*G06F 16/2453* (2019.01)
*G06F 16/2455* (2019.01)
*H04W 36/00* (2009.01)

(52) U.S. Cl.
CPC ...... *H04L 67/2842* (2013.01); *H04L 67/2847* (2013.01); *H04L 67/2852* (2013.01); *H04L 67/2885* (2013.01); *G06F 16/00* (2019.01); *G06F 16/24539* (2019.01); *G06F 16/24552* (2019.01); *H04W 36/0011* (2013.01)

(58) Field of Classification Search
CPC ............... H04L 29/08; H04L 29/08702; H04L 29/08801
See application file for complete search history.

(56) References Cited

U.S. PATENT DOCUMENTS

| | | | |
|---|---|---|---|
| 9,948,740 B1* | 4/2018 | Benson | H04L 67/2842 |
| 2004/0181576 A1 | 9/2004 | Lin et al. | |
| 2010/0318745 A1* | 12/2010 | Wheeler | G06F 16/9574 |
| | | | 711/136 |
| 2012/0239725 A1* | 9/2012 | Hartrick | H04L 69/161 |
| | | | 709/203 |
| 2013/0054800 A1* | 2/2013 | Fernandez Alonso | |
| | | | H04L 67/2842 |
| | | | 709/224 |
| 2013/0054831 A1 | 2/2013 | Calo et al. | |
| 2013/0188599 A1 | 7/2013 | Zakrzewski et al. | |
| 2013/0290465 A1* | 10/2013 | Harrison | H04L 67/04 |
| | | | 709/213 |
| 2013/0290466 A1 | 10/2013 | Lee et al. | |
| 2013/0326133 A1* | 12/2013 | Lee | G06F 12/0875 |
| | | | 711/108 |
| 2014/0064249 A1* | 3/2014 | Lee | H04W 36/023 |
| | | | 370/331 |
| 2015/0350364 A1* | 12/2015 | Vadura | H04L 67/2842 |
| | | | 709/214 |
| 2015/0365819 A1 | 12/2015 | Zhu et al. | |
| 2016/0119848 A1 | 4/2016 | Yang et al. | |

FOREIGN PATENT DOCUMENTS

| | | |
|---|---|---|
| CN | 102843426 A | 12/2012 |
| CN | 103067981 A | 4/2013 |
| CN | 103430516 A | 12/2013 |
| CN | 103685368 A | 3/2014 |
| CN | 103918244 A | 7/2014 |
| CN | 104159249 A | 11/2014 |
| CN | 104519139 A | 4/2015 |
| EP | 2552082 A1 | 1/2013 |
| EP | 2953400 A1 | 12/2015 |
| EP | 3160111 A1 | 4/2017 |
| WO | 0176192 A2 | 10/2001 |
| WO | 2014127515 A1 | 8/2014 |

\* cited by examiner

CACHE METHOD, CACHE EDGE SERVER, CACHE CORE SERVER, AND CACHE SYSTEM

CROSS-REFERENCE TO RELATED APPLICATIONS

This application is a continuation of International Application No. PCT/CN2015/096975, filed on Dec. 10, 2015, which claims priority to Chinese Patent Application No. 201410856429.0, filed on Dec. 31, 2014. The disclosures of the aforementioned applications are hereby incorporated by reference in their entireties.

TECHNICAL FIELD

The present application relates to communications technologies, and in particular, to a cache method, a cache edge server, a cache core server, and a cache system.

BACKGROUND

With the rapid development of network transmission technologies, more and more contents can be provided over the Internet. For example, users can read news, listen to music, watch movies, and download application programs over the Internet. Web Cache technology is an available solution that is capable of more effectively providing users with contents on a network, reducing load of application servers, and saving transmission (backhaul) bandwidth between radio access network and core network.

FIG. 1 is a schematic diagram of a network cache system. For ease of understanding, the network cache system is simplified, where UMTS represents a Universal Mobile Telecommunications System, and LTE represents a Long Term Evolution system. A cache edge node (the cache edge server 13 in FIG. 1) is deployed on a radio access network (RAN). A cache token server 15 is deployed on a core network. A cache core node (the cache core server 1a in FIG. 1) is deployed on an egress of a gateway GPRS support node (GGSN) 17 or an egress of a PDN gateway (PGW) 19. GPRS stands for general packet radio service, and PDN stands for packet data network.

A basic principle of the network cache system is as follows: A content copy of an application server 2 may be cached in the cache core server 1a and the cache edge server 13. After determining that the content copy has been cached in the cache edge server 13, the cache core server 1a adds a flag to a Transmission Control Protocol (TCP) Option (TCP Option) field and instructs the cache token server 15 to perform a TCP payload replacement. The cache token server 15 replaces a TCP payload that matches the cached content with a token of several bytes. The cache edge server 13 finds, according to token server information, the cached content copy in the cache edge server 13, restores the replaced TCP payload, and sends the replaced TCP payload to user equipment 11.

Although the existing network cache technology can reduce the load of the application server and save the transmission bandwidth between the radio access network and the core network, before sending the restored TCP packet to the user equipment 11, the cache edge server 13 needs to wait until a TCP packet of the cache core server 1a is restored. Therefore, download speed of the user equipment 11 is not further improved. Moreover, the existing network cache technology requires deployment of three types of nodes: the cache core server 1a, the cache token server 15, and the cache edge server 13, and costs are high.

SUMMARY

An objective of the present application is to provide a network cache system with a relatively low deployment cost and a faster download speed.

To achieve the foregoing objective, a first embodiment of the present application provides a cache method used in a cache edge server. The method includes: receiving, from a cache core server by using a channel, information about a Transmission Control Protocol (TCP) flow; determining, according to the information, whether the cache edge server stores content corresponding to the information; sending a migrate-out request to the cache core server based on that the cache edge server stores the content corresponding to the information; receiving a migrate-out response from the cache core server upon the sending of the migrate-out request; and performing a TCP connection to user equipment according to the migrate-out response.

With reference to the first embodiment, in a first possible implementation manner, the cache method further includes: transferring the content to the user equipment by using the TCP connection; receiving an acknowledgment message from the user equipment to acknowledge that the user equipment has received the content; sending a migrate-back request to the cache core server upon the acknowledgment message, to migrate the Transmission Control Protocol TCP connection back to the cache core server; receiving a migrate-back response from the cache core server upon the migrate-back request; and disabling the TCP connection to the user equipment upon the migrate-back response.

With reference to the first embodiment, in a second possible implementation manner, the cache method further includes: transferring a first part of the content to the user equipment by using the TCP connection; and upon moving, by the user equipment, to a signal range of another server, transferring a second part of the content to the user equipment by using the another server.

With reference to the first embodiment and the second implementation manner, in a third possible implementation manner, the cache method further includes: receiving a migrate-back request from the cache core server after the second part of the content is transferred to the user equipment; disabling the TCP connection to the user equipment based on the migrate-back request; and sending a migrate-back response to the cache core server, so that the cache core server restores the TCP connection to the user equipment.

With reference to the first embodiment, in a fourth possible implementation manner, the cache method further includes: receiving the TCP flow that includes a cache token and is from the cache core server; detecting the cache token from the TCP flow; and sending a request to the cache core server based on the cache token, to request the information about the TCP flow.

To achieve the foregoing objective, a second embodiment of the present application provides a cache method used in a cache core server, including: receiving a migrate-out request from a cache edge server; disabling a TCP connection to user equipment based on the migrate-out request; and transferring a migrate-out response to the cache edge server, so that the cache edge server performs the TCP connection to the user equipment according to the migrate-out response.

With reference to the second embodiment, in a first possible implementation manner, the cache method further includes: receiving a migrate-back request from the cache edge server; and restoring the TCP connection to the user equipment according to the migrate-back request.

With reference to the second embodiment, in a second possible implementation manner, the cache method further includes: receiving an acknowledgment message from another server, where the acknowledgment message is used to acknowledge that the user equipment has received content requested by the user equipment; acknowledging, according to the acknowledgment message, that the user equipment moves from the cache edge server to another server; sending a migrate-back request to the cache edge server based on that the user equipment moves from the cache edge server to the another server; receiving a migrate-back response from the user equipment upon the migrate-back request; and restoring the TCP connection to the user equipment according to the migrate-back response.

To achieve the foregoing objective, a third embodiment of the present application provides a cache edge server, including: a transceiver module, configured to receive, from a cache core server, information about a TCP flow; and a processing module, configured to determine, according to the information, whether the cache edge server stores content corresponding to the information; where the transceiver module is further configured to send a migrate-out request to the cache core server based on that the cache edge server stores the content corresponding to the information; the transceiver module is further configured to receive a migrate-out response from the cache core server upon the sending of the migrate-out request; and the processing module is further configured to: perform a TCP connection to user equipment according to the migrate-out response by using the transceiver module.

With reference to the third embodiment, in a first possible implementation manner, the processing module is further configured to, by using the transceiver module: transfer the content to the user equipment by using the TCP connection; receive an acknowledgment message from the user equipment to acknowledge that the user equipment has received the content; send a migrate-back request to the cache core server upon the acknowledgment message, to migrate the TCP connection back to the cache core server; receive a migrate-back response from the cache core server upon the migrate-back request; and disable the TCP connection to the user equipment upon the migrate-back response.

With reference to the third embodiment, in a second possible implementation manner, the processing module is further configured to, by using the transceiver module: transfer a first part of the content to the user equipment by using the TCP connection; and upon moving, by the user equipment, to a signal range of another server, transfer a second part of the content to the user equipment by using the another server.

With reference to the third embodiment and the second implementation manner, in a third possible implementation manner, the processing module is further configured to, by using the transceiver module: receive a migrate-back request from the cache core server after the second part of the content is transferred to the user equipment; disable the TCP connection to the user equipment based on the migrate-back request; and send a migrate-back response to the cache core server, so that the cache core server restores the TCP connection to the user equipment.

With reference to the third embodiment, in a fourth possible implementation manner, the processing module is further configured to, by using the transceiver module: receive the TCP flow that includes a cache token and is from the cache core server; detect the cache token from the TCP flow; and send a request to the cache core server based on the cache token, to request the information about the TCP flow.

To achieve the foregoing objective, a fourth embodiment of the present application provides a cache core server, including: a transceiver module, configured to receive a migrate-out request from a cache edge server; and a processing module, configured to disable a TCP connection to user equipment based on the migrate-out request; where the transceiver module is further configured to transfer a migrate-out response to the cache edge server, so that the cache edge server performs the TCP connection to the user equipment according to the migrate-out response.

With reference to the fourth embodiment, in a first possible implementation manner, the transceiver module is further configured to receive a migrate-back request from the cache edge server; and the processing module is further configured to restore, by using the transceiver module, the TCP connection to the user equipment according to the migrate-back request.

With reference to the fourth embodiment, in a second possible implementation manner, the transceiver module is further configured to receive an acknowledgment message from another server, where the acknowledgment message is used to acknowledge that the user equipment has received content requested by the user equipment; the processing module is further configured to acknowledge, according to the acknowledgment message, that the user equipment moves from the cache edge server to another server; the transceiver module is further configured to send a migrate-back request to the cache edge server based on that the user equipment moves from the cache edge server to the another server; the transceiver module is further configured to receive a migrate-back response from the cache edge server upon the migrate-back request; and the processing module is further configured to restore, by using the transceiver module, the TCP connection to the user equipment according to the migrate-back response.

To achieve the foregoing objective, a fifth embodiment of the present application provides a cache system, including: a cache core server, configured to transfer information about a TCP flow; and a cache edge server, configured to send a migrate-out request to the cache core server based on the information about the TCP flow; where the cache core server is further configured to: based on the migrate-out request, disable a TCP connection to user equipment and transfer a migrate-out response to the cache edge server; and the cache edge server is further configured to perform the TCP connection to the user equipment according to the migrate-out response, to transfer content to the user equipment.

With reference to the fifth embodiment, in a first possible implementation manner, after transferring the content, the cache edge server is further configured to send a migrate-back request to the cache core server, and the cache core server is further configured to restore the TCP connection to the user equipment according to the migrate-back request.

With reference to the fifth embodiment, in a second possible implementation manner, the cache core server is further configured to receive an acknowledgment message from another server, and send a migrate-back request to the cache edge server according to the acknowledgment message; where based on the migrate-back request, the cache edge server disables the TCP connection to the user equipment, and sends a migrate-back response to the cache core server; and the cache core server is further configured to restore the TCP connection to the user equipment according to the migrate-back response.

In conclusion, through the embodiments of the present application, a network cache system can implement an existing function without a cache token server. In addition, because a cache token server is omitted, download speeds can further improved, and costs for deploying the cache token server are saved. Problems in the prior art are effectively overcome.

DESCRIPTION OF EMBODIMENTS

The following describes the technical solutions in the embodiments of the present application with reference to the accompanying drawings. Table 1 lists definitions of abbreviations and key terms related to subsequent embodiments.

TABLE 1

| Abbreviation | Full Name |
| --- | --- |
| CDN | content delivery network |
| LTE | long term evolution |
| UMTS | universal mobile telecommunications system |
| RAN | radio access network |
| PS-Core | packet switched core network |
| eNB | E-UTRAN NodeB (evolved NodeB) |
| BTS | base transceiver station |
| RNC | radio network controller |
| SGW | serving gateway |
| PGW | packet data network gateway |
| SGSN | serving GPRS support node |
| GGSN | gateway GPRS support node |
| UE | user equipment |
| PDP | packet data protocol |
| RADIUS | remote authentication dial in user service |
| RTT | round trip time |
| TCP | transmission control protocol |
| HTTP | hypertext transfer protocol |
| FTP | file transfer protocol |
| P2P | peer-to-peer |

First Embodiment

Figure 1:
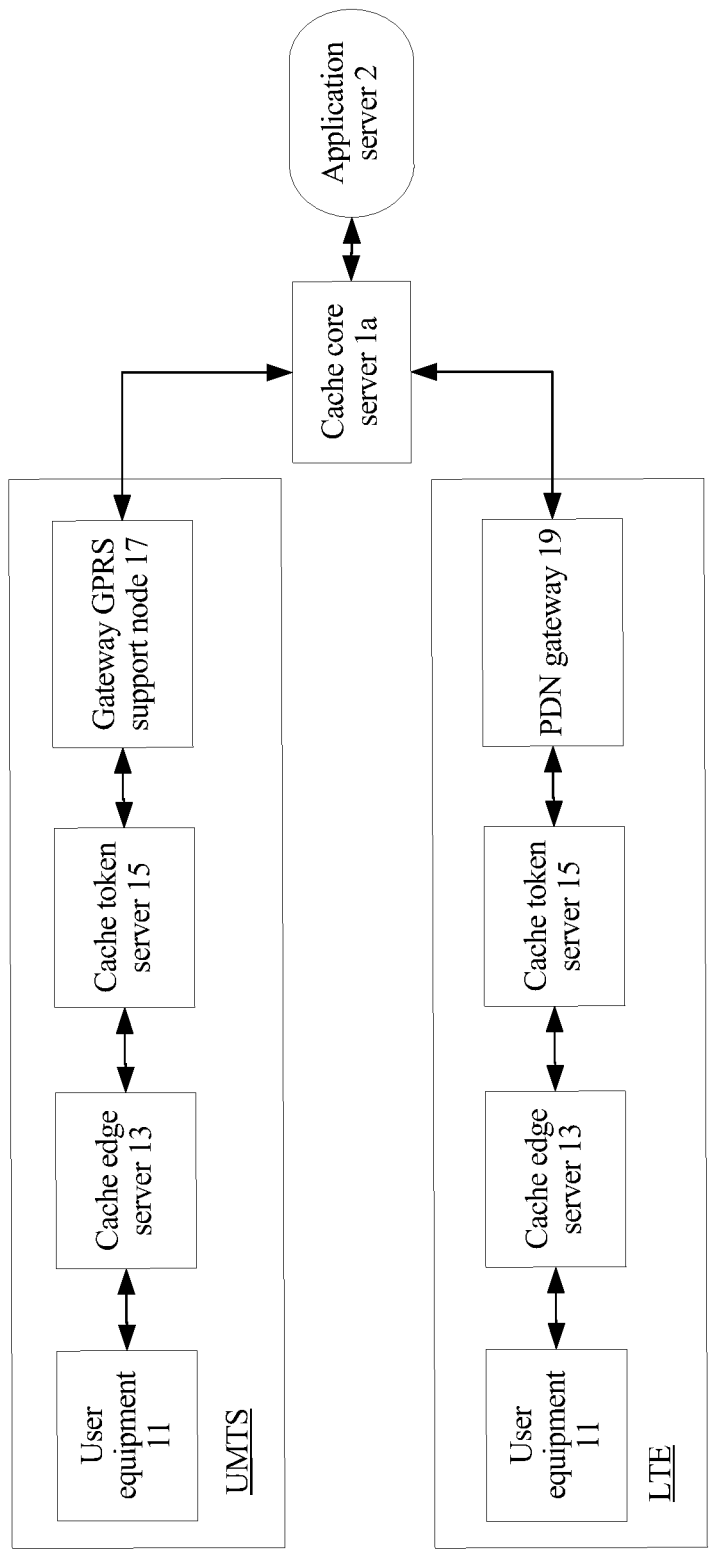
FIG. 1 is a block diagram of an existing network cache system.
Figure 2:
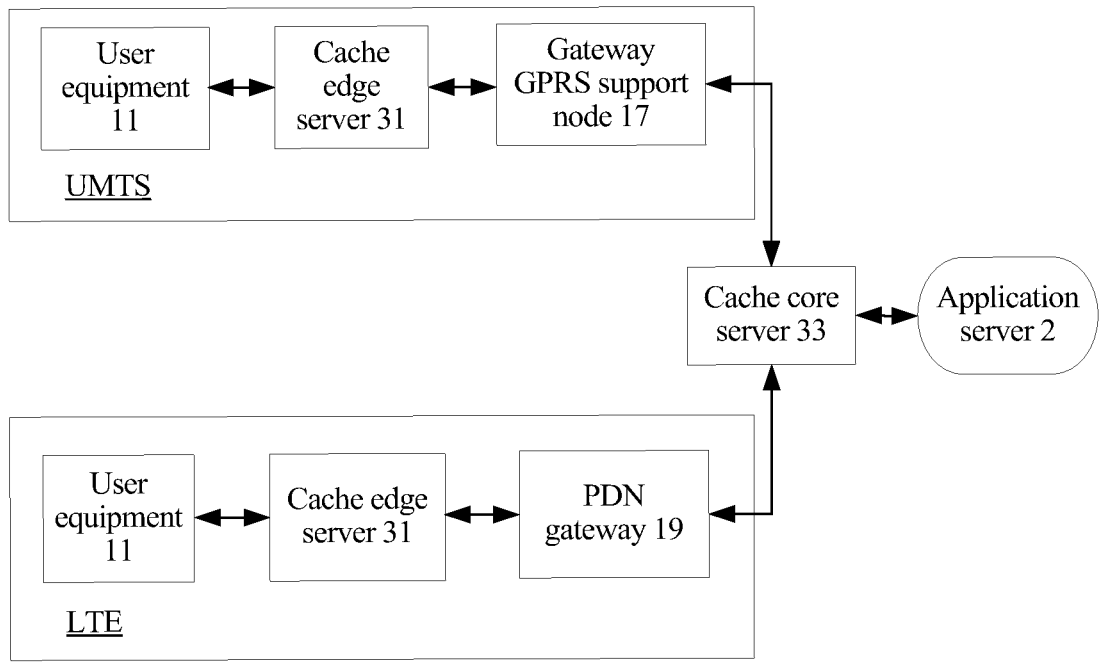
FIG. 2 is a block diagram of a network cache system according to a first embodiment of the present application.

FIG. 2 is a block diagram of a network cache system according to the first embodiment of the present application. It may be learned from FIG. 2 that, the network cache system includes a UMTS and a LTE system, where the UMTS and the LTE system are separately connected to a cache core server 33, which is then connected to an application server 2. Specifically, the UMTS includes user equipment 11, a cache edge server 31, and a gateway GPRS support node 17. The user equipment 11 is connected to the cache edge server 31, the cache edge server 31 is connected to the gateway GPRS support node 17, and the gateway GPRS support node 17 is connected to the cache core server 33. The LTE system includes user equipment 11, a cache edge server 31, and a PDN gateway 19, where the user equipment 11 is connected to the cache edge server 31, the cache edge server 31 is connected to the PDN gateway 19, and the PDN gateway 19 is connected to the cache core server 33.

Figure 3:
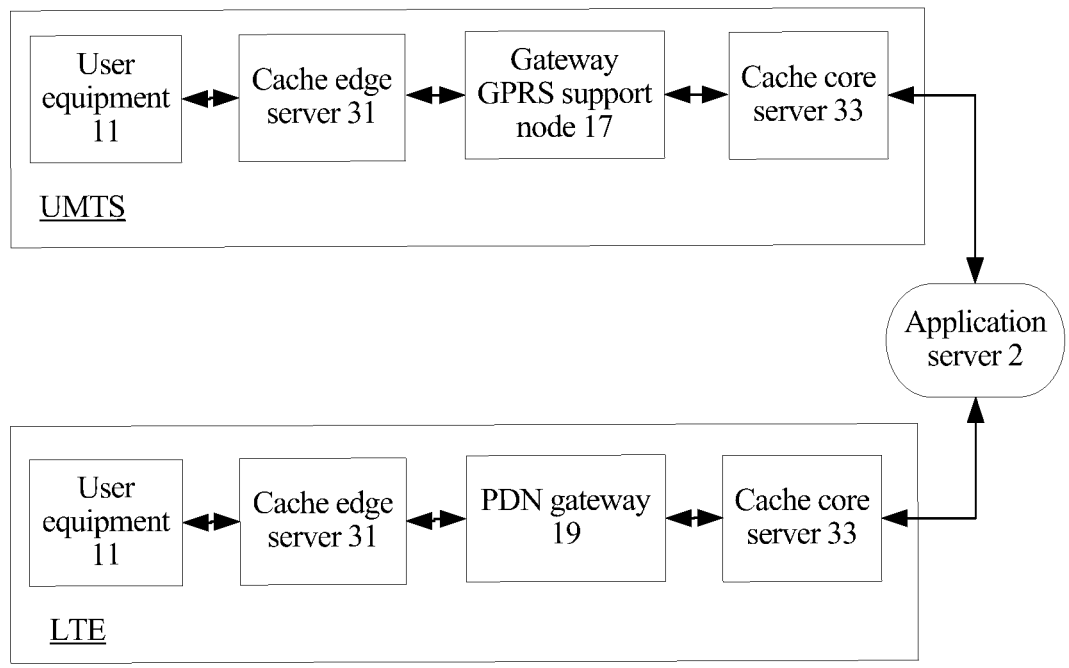
FIG. 3 is a block diagram of another network cache system according to the first embodiment of the present application.

FIG. 3 is a block diagram of another network cache system according to the first embodiment of the present application. A difference between FIG. 3 and the network cache system in FIG. 2 lies in that the UMTS and the LTE system in FIG. 3 each has a cache core server 33.

Figure 4:
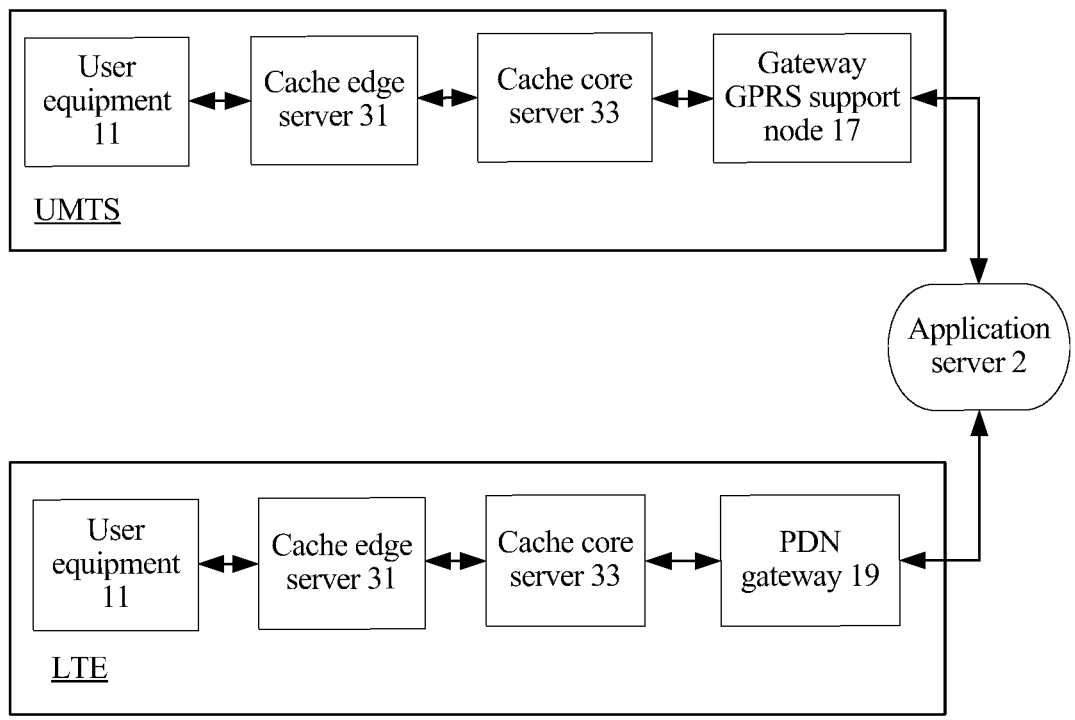
FIG. 4 is a block diagram of still another network cache system according to the first embodiment of the present application.

FIG. 4 is a block diagram of still another network cache system according to the first embodiment of the present application. A difference between FIG. 4 and the network cache system in FIG. 3 lies in that the cache core server 33 of the UMTS in FIG. 4 is disposed between the cache edge server 31 and the gateway GPRS support node 17, and the cache core server 33 of the LTE system in FIG. 4 is disposed between the cache edge server 31 and the PDN gateway 19.

Figure 5:
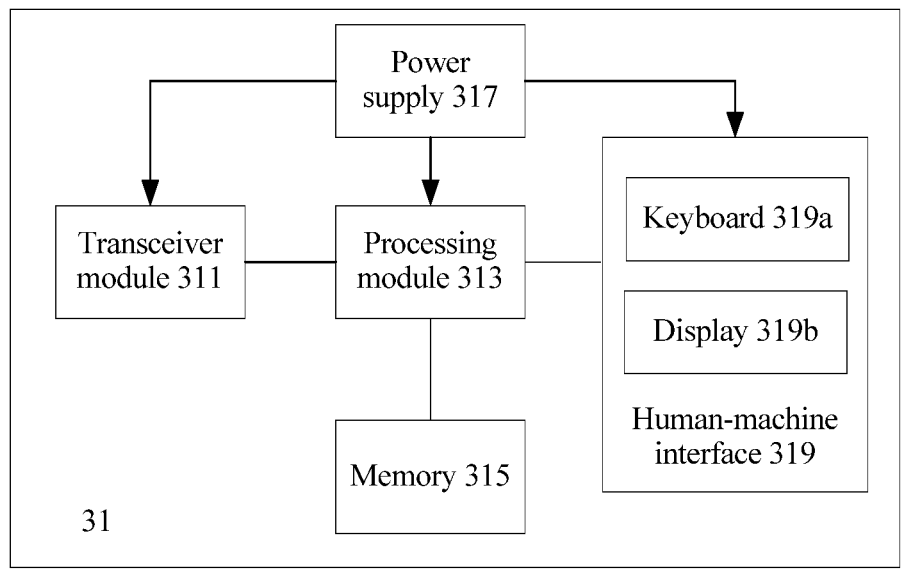
FIG. 5 is a block diagram of a cache edge server according to the first embodiment of the present application.

FIG. 5 is a simplified block diagram of a cache edge server 31. It may be learned from FIG. 5 that, the cache edge server 31 includes a transceiver module 311, a processing module 313, a memory 315, a power supply 317, and a human-machine interface 319. The processing module 313 is coupled to the transceiver module 311, the memory 315, and the human-machine interface 319. The power supply 317 is configured to supply power to the transceiver module 311, the processing module 313, and the human-machine interface 319. The memory 315 may store an operating system and other application programs. The human-machine interface 319 may provide connections to at least a keyboard 319a and a display 319b. The transceiver module 311 is configured to perform communications between the cache edge server 31 and other devices/apparatuses or communication networks.

Figure 6:
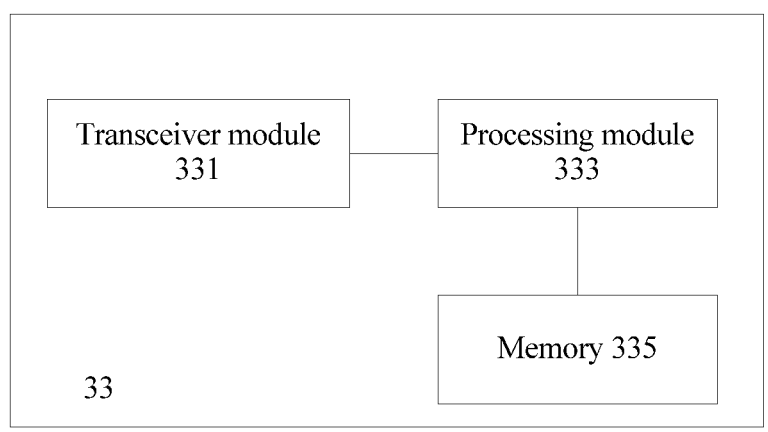
FIG. 6 is a block diagram of a cache core server according to the first embodiment of the present application.

FIG. 6 is a functional block diagram of the cache core server 33. It may be learned from FIG. 6 that, the cache core server 33 includes a transceiver module 331, a processing module 333, and a memory 335. The processing module 333 is coupled to the transceiver module 331 and the memory 335. The transceiver module 331 is configured to perform communication between the cache core server 33 and other devices/apparatuses or communication networks. The memory 335 may store content provided for the user equipment 11, an operating system, and other application programs. For brevity, the following describes only functions of the user equipment 11, the cache edge server 31, the cache core server 33, and the application server 2 in the network cache system according to this embodiment of the present application.

Figure 7A:
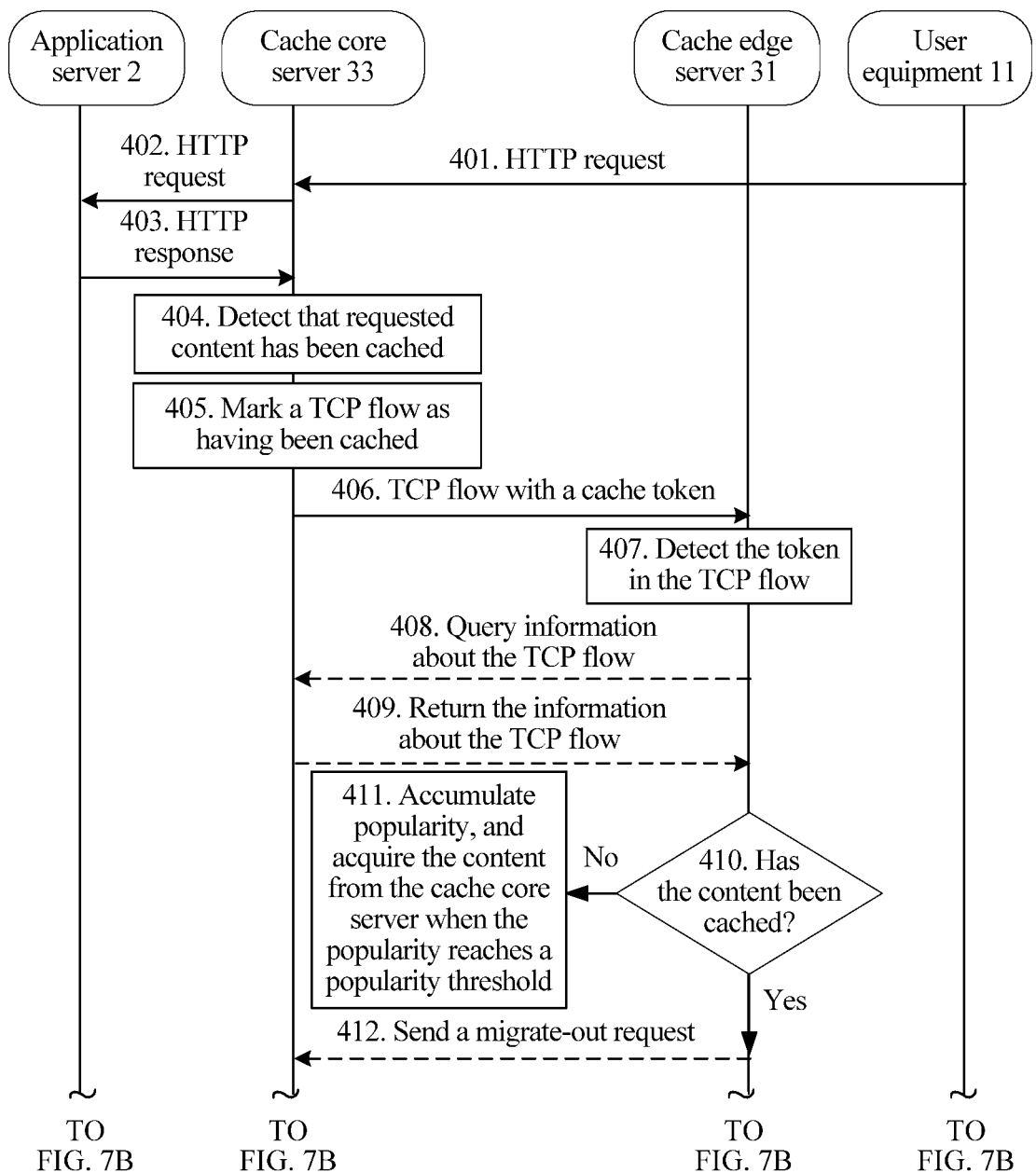
FIG. 7A and FIG. 7B are a signaling flowchart of a network cache system according to the first embodiment of the present application.
Figure 7B:
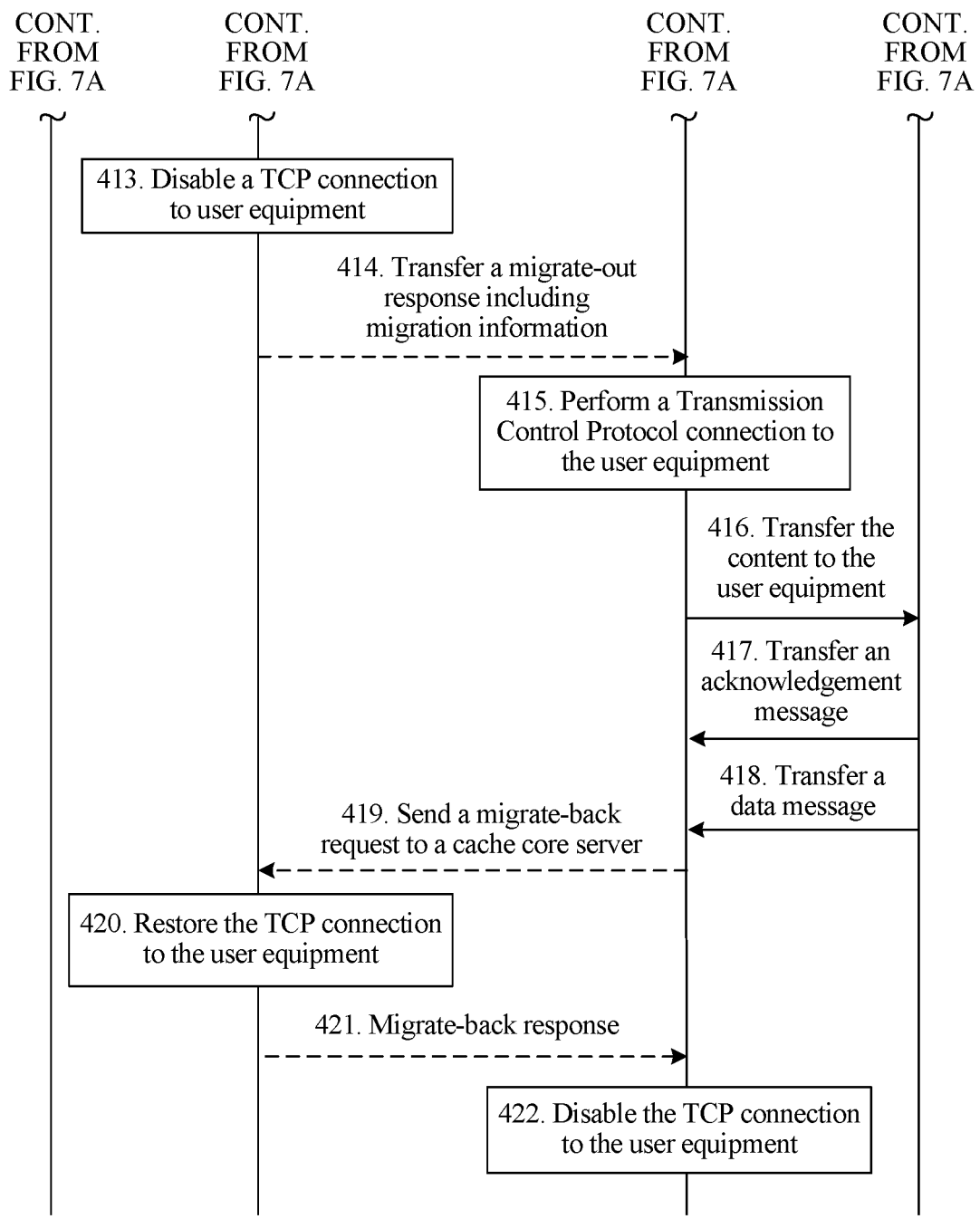

FIG. 7A and FIG. 7B together is a signaling flowchart of a network cache system according to the first embodiment of the present application, and the signaling flowchart is applicable to the network cache systems in FIG. 2, FIG. 3, and FIG. 4. In step 401, user equipment 11 sends, by using TCP, a Hypertext Transfer Protocol (HTTP) request to a cache core server 33, to request content from an application server 2. In step 402, a transceiver module 331 of the cache core server 33 sends the HTTP request to the application server 2; in step 403, the application server 2 sends an HTTP response to the cache core server 33, where the HTTP response includes at least partial information of the content.

In step 404, a processing module 333 of the cache core server 33 may detect, according to the partial information of the content included in the HTTP response, that the content requested by the user equipment 11 has been cached in a memory 335 of the cache core server 33. Specifically, the processing module 333 of the cache core server 33 may determine, according to a content identifier (Content-ID) obtained by performing a hash operation on the partial information of the content, that the memory 335 has cached the requested content.

In step 405, the processing module 333 of the cache core server 33 marks a TCP flow as having been cached. Specifically, the processing module 333 marks the TCP flow, that is, extends a TCP Option field, and marks that the cache core server 33 has cached the content. In step 406, the transceiver module 331 of the cache core server 33 sends the TCP flow with a cache token. In step 407, upon detecting that the TCP flow has the cache token, the processing module 313 of the cache edge server 31 learns that the cache core server 33 has cached the content. In step 408, based on the detected cache token, the transceiver module 311 of the cache edge server 31 queries, by using an outbound channel from the marking cache core server 33, information about the cached content corresponding to the TCP flow.

In step 409, the transceiver module 331 of the cache core server 33 sends, by using the outbound channel, information about the TCP flow, where the information is about the cached content, and the information may include a uniform resource locator (URL), the content identifier, a TCP sequence number of a start location of an HTTP body, and the like. In step 410, the transceiver module 311 of the cache edge server 31 receives, by using the outbound channel from the cache core server 33, the information about the TCP flow, and the processing module 313 determines, according to the information, whether the memory 315 of the cache edge server 31 stores the content corresponding to the information, that is, whether the memory 315 stores the content that has been cached by the marking cache core server 33.

If the cache edge server 31 does not store the content corresponding to the information, in step 411, the processing module 313 of the cache edge server 31 accumulates a quantity of query times of the content, where if the quantity of the query times of the content is greater than or equal to a threshold, the processing module 313 acquires, by using the transceiver module 311 and the outbound channel, the content from the cache core server 33; if the cache edge server 31 stores the content corresponding to the information, in step 412, the transceiver module 311 sends, by using the outbound channel, a migrate-out request to the cache core server 33. In step 413, the transceiver module 331 of the cache core server 33 receives the migrate-out request from the cache edge server 31, and the processing module 333 of the cache core server 33 disables, based on the migrate-out request, a TCP connection to the user equipment 11, stops sending data by using the TCP connection, and keeps TCP connection information.

In step 414, the transceiver module 331 of the cache core server 33 transfers, by using the outbound channel, a migrate-out response to the cache edge server 31, where the migrate-out response includes but is not limited to information in the following Table 2.

TABLE 2

Maximum sending sequence number of a packet sent by a local end
Sequence number of an earliest packet that is sent over TCP by a local end
but is not yet acknowledged, that is, sequence number of the first byte in a sending buffer of a local end
Next sequence number that a local end expects to receive
Data length of a sending buffer
Data length of a receiving buffer
Size of a receiving window of a peer end
Size of a sending congestion window of a local end
Maximum value of a sliding window
Size of a data packet received for the last time
TCP Option information In step 415, the transceiver module 311 of the cache edge server 31 receives the migrate-out response from the cache core server 33, and the processing module 313 establishes, by using the transceiver module 311 according to the information included in the migrate-out response, a TCP connection to the user equipment 11. In step 416, the transceiver module 311 of the cache edge server 31 transfers, by using the TCP connection, the content requested by the user equipment 11 to the user equipment 11. In step 417, the transceiver module 311 of the cache edge server 31 receives, by using the TCP connection, an acknowledgment message from the user equipment 11, where the acknowledgment message indicates that the user equipment 11 has received all requested content. In step 418, the transceiver module 311 of the cache edge server 31 receives, by using the TCP connection, a data message from the user equipment 11, where the data message indicates that the user equipment 11 initiates a new request. In step 419, upon the received data message or the received acknowledgment message, the transceiver module 311 of the cache edge server 31 sends, by using the outbound channel, a migrate-back request to the cache core server 33, to migrate the TCP connection back to the cache core server 33.

It should be noted that, in this signaling flow, as long as either of step 417 and step 418 is performed, step 419 may be performed to migrate the TCP connection back to the cache core server 33. In other words, as long as the user equipment 11 initiates a new request, even if the user equipment 11 has not received all the requested content, step 419 may be directly performed to migrate the TCP connection back to the cache core server 33; or as long as it is acknowledged that the user equipment 11 has received all the requested content, step 419 may be performed to migrate the TCP connection back to the cache core server 33.

In addition, the migrate-back request includes but is not limited to the information in Table 2, so that the cache core server 33 may restore, according to the information, the TCP connection to the user equipment 11. In step 420, the transceiver module 331 of the cache core server 33 receives the migrate-back request from the cache edge server 31, and the processing module 333 restores, by using the transceiver module 331 according to the migrate-back request, the TCP connection to the user equipment 11. Then, the cache core server 33 may perform TCP flow transmission with the user equipment 11 again; in step 420, the transceiver module 331 of the cache core server 33 sends, by using the outbound channel, a migrate-back response to the cache edge server 31; in step 421, the cache edge server 31 disables the TCP connection to the user equipment.

In conclusion, in the first embodiment of the present application, after acknowledging that a local end actually stores content requested by user equipment 11, a cache edge server 31 may perform a TCP connection to the user equipment and transfer, by using the TCP connection, the content requested by the user equipment 11 to the user equipment 11. In this way, a cache token server may be not deployed, so as to improve a download speed and reduce costs for deploying the cache token server.

Second Embodiment

Figure 8:
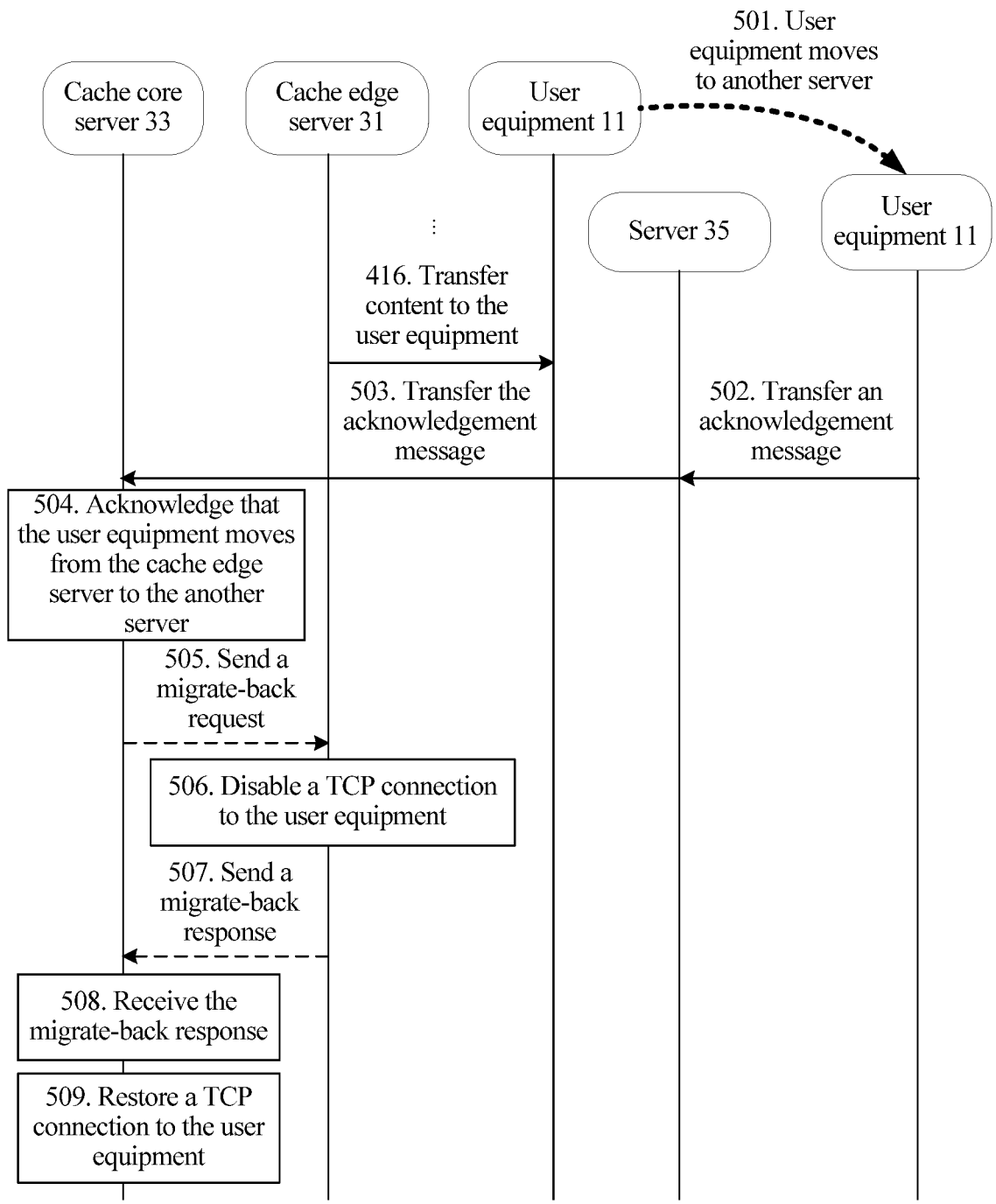
FIG. 8 is a signaling flowchart of a network cache system according to a second embodiment of the present application.

FIG. 8 is a signaling flowchart of a network cache system according to a second embodiment of the present application, and the signaling flowchart may be applicable to the network cache systems in FIG. 2, FIG. 3, and FIG. 4. For the part related to the application server 2, refer to related descriptions in the first embodiment. For brevity, in FIG. 8, the network cache system in the second embodiment includes only user equipment 11, a cache edge server 31, a cache core server 33, and a server 35. The part that is the same as that in the signaling flow in FIG. 7A and FIG. 7B is not illustrated or described in FIG. 8 and the following descriptions. In addition, the cache edge server 31 includes a cache edge function and a RAN function, and the server 35 includes the cache edge function and/or the RAN function. A structure of the cache edge server 31 is also the same as that of the server 35. Therefore, in the following description about the server 35, component numbers in a structural diagram of the cache edge server 31 are directly used, and are not depicted separately in a structural diagram of the server 35.

In step 416, a transceiver module 311 of the cache edge server 31 transfers, by using a TCP connection, content to the user equipment 11. After the content is transferred, in step 501, the user equipment 11 moves to a signal range of another server (that is, the server 35). Therefore, in step 502, an acknowledgment message sent by the user equipment 11 is received by a transceiver module 311 of the server 35 by using a TCP connection. In step 503, the transceiver module 311 of the server 35 forwards, by using the TCP connection, the acknowledgment message to the cache core server 33. In step 504, a transceiver module 331 of the cache core server 33 receives, by using a TCP connection, the acknowledgment message from the another server (that is, the cache edge server 35). A processing module 333 acknowledges, according to the acknowledgment message, that the user equipment 11 moves from the cache edge server 31 to the another server 35. Specifically, before step 416, the cache core server 33 has stopped sending data on the TCP connection and should not receive a message by using the TCP connection. Therefore, the processing module 333 may acknowledge, according to the acknowledgment message, that the user equipment 11 moves from the cache edge server 31 to the another server 35.

In step 505, based on that the user equipment 11 moves from the cache edge server 31 to the server 35, the transceiver module 331 of the cache core server 33 sends, by using an outbound channel, a migrate-back request to the cache edge server 31. In step 506, a processing module 313 of the cache edge server 31 receives, by using the transceiver module 311 and the outbound channel, the migrate-back request from the cache core server 33. The processing module 313 of the cache edge server 31 disables, by using the transceiver module 311, the TCP connection to the user equipment 11 based on the migrate-back request. In step 507, the processing module 313 of the cache edge server 31 sends, by using the transceiver module 311 and the outbound channel, a migrate-back response to the cache core server 33. It should be noted that, the migrate-back response includes but is not limited to the information in Table 2, so that the cache core server 33 restores, according to the information, the TCP connection to the user equipment 11.

In step 508, the transceiver module 331 of the cache core server 33 receives, by using the outbound channel, the migrate-back response from the cache edge server 31. In step 509, the processing module 333 of the cache core server 33 restores, by using the transceiver module 331 according to the migrate-back response, the TCP connection to the user equipment 11. Then, the cache core server 33 may perform TCP flow transmission with the user equipment 11 again.

Figure 9:
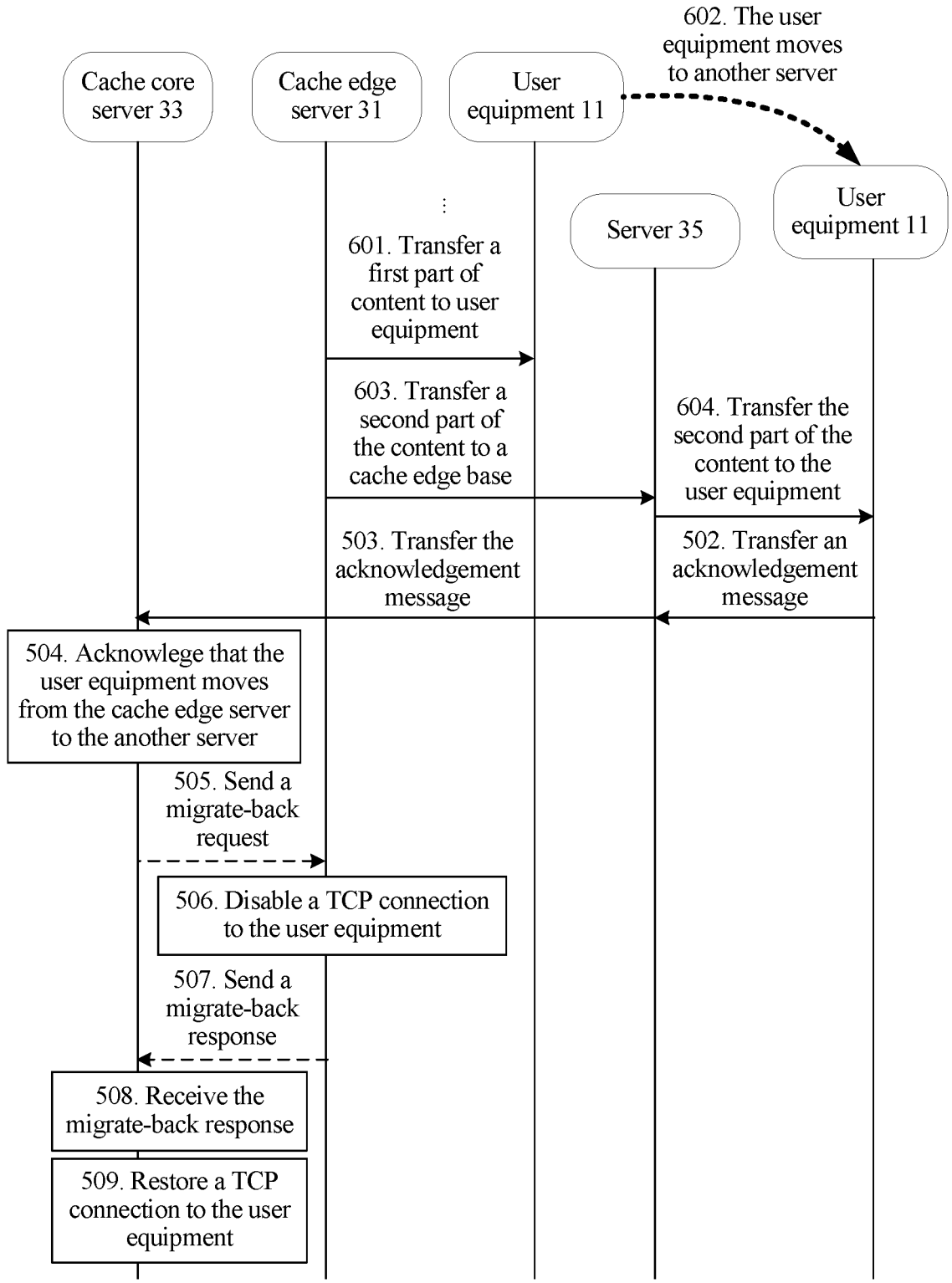
FIG. 9 is another signaling flowchart of the network cache system according to the second embodiment of the present application.

Another example of this embodiment is depicted in FIG. 9, where FIG. 9 is a signaling flowchart of a network cache system, and is applicable to the network cache systems in FIG. 2, FIG. 3, and FIG. 4. For a part related to an application server 2, refer to related descriptions in the first embodiment. For brevity, in FIG. 9, the network cache system includes only user equipment 11, a cache edge server 31, a cache core server 33, and a server 35. The part that is the same as that in a signaling flow in FIG. 7A and FIG. 7B or FIG. 8 is not illustrated or described in FIG. 9 and the following description. In addition, the cache edge server 31 includes a cache edge function and a RAN function, and the server 35 includes the cache edge function and/or the RAN function. A structure of the cache edge server 31 is also the same as that of the server 35. Therefore, in the following description about the server 35, component numbers in a structural diagram of the cache edge server 31 are directly used, and are not depicted separately in a structural diagram of the server 35.

The following describes only a part that is different from the signaling flow in FIG. 7A and FIG. 7B or FIG. 8. After step 415 in FIG. 7A and FIG. 7B, in step 601, the processing module 313 of the cache edge server 31 transfers, by using the transceiver module 311 and the TCP connection, a first part of the content to the user equipment 11. In step 602, the user equipment 11 moves to a signal range of another server (that is, the server 35). In step 603, upon the moving, by the user equipment 11, to the signal range of the server 35, the processing module 313 transfers, by using the transceiver module 311 and the server 35, a second part of the content to the user equipment 11, so that the user equipment 11 can receive all the content. Specifically, each server can communicate with one another. Therefore, when the user equipment 11 moves to the signal range of the server 35, the cache edge server 31 may also learn that the user equipment 11 moves to the server 35 and therefore transfer, by using a backend network, the second part of the content to the server 35; then, the server 35 transfers the second part of the content to the user equipment 11. All steps after step 603 in FIG. 9 are depicted and described in FIG. 8 and the related descriptions of FIG. 8, and details are not described herein.

In conclusion, in the second embodiment of the present application, after acknowledging that a local end actually stores content requested by user equipment 11, a cache edge server 31 may perform a TCP connection and transfer, by using the TCP connection, the content requested by the user equipment 11 to the user equipment 11. In this way, a cache token server may be not deployed, so as to improve a download speed and reduce costs for deploying the cache token server.

Figure 10:
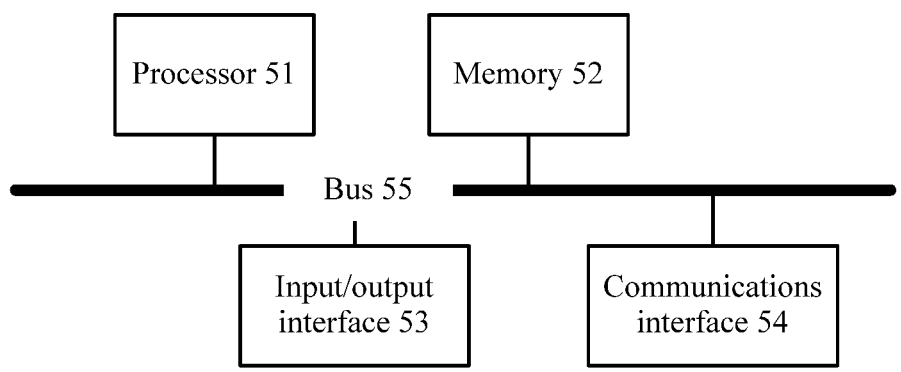
FIG. 10 is a simplified structural diagram of hardware platform of a cache edge server according to an embodiment of the present application.

FIG. 10 is a schematic structural diagram of hardware of a cache edge server 5 according to an embodiment of the present application. As shown in FIG. 10, the cache edge server 5 includes a processor 51, a memory 52, an input/output interface 53, a communications interface 54, and a bus 55. The processor 51, the memory 52, the input/output interface 53, and the communications interface 54 implement mutual communication connection by using the bus 55.

The processor 51 may be a general-purpose central processing unit (CPU), a microprocessor, an application specific integrated circuit (ASIC), or one or more integrated circuits, and is configured to execute a related program, to implement the technical solutions provided in embodiments of the present application.

The memory 52 may be a read-only memory (ROM), a static storage device, a dynamic storage device, or a random access memory (RAM). The memory 52 may store an operating system or another application program. When the technical solutions provided in the embodiments of the present application are implemented by using software or firmware, program code used to implement the technical solutions provided in the embodiments of the present application is stored in the memory 52, and is executed by the processor 51.

The input/output interface 53 is configured to receive input data and information, and to output data such as an operation result.

The communications interface 54 uses a transceiver apparatus, such as but not limited to, a transceiver and a transceiver module, so as to implement communication between the cache edge server 5 and another device or communications network.

The bus 55 may include a channel to transfer information between parts (such as the processor 51, the memory 52, the input/output interface 53, and the communications interface 54) of a multimedia processing apparatus 5.

It should be noted that, although only the processor 51, the memory 52, the input/output interface 53, the communications interface 54, and the bus 55 of the illustrated multimedia processing apparatus 5 are shown in FIG. 10, in a specific implementation process, a person skilled in the art should understand that the cache edge server 5 further includes another component requested for implementing normal operation. Furthermore, according to a specific requirement, a person skilled in the art should understand that the cache edge server 5 may further include a hardware component that implements another additional function. Furthermore, a person skilled in the art should understand that the cache edge server 5 may include only a component or a module that is necessary for implementing this embodiment of the present application, and does not need to include all components shown in FIG. 10.

The hardware structure shown in FIG. 10 and the foregoing descriptions are applicable to various cache core servers and user equipments provided in the embodiments of the present application.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a disk, an optical disc, a read-only memory (ROM), or a random access memory (RAM).

Specific examples are used in this specification to describe the principle and implementation manners of the present application. The descriptions of the foregoing embodiments are merely intended to help understand the method and idea of the present application. In addition, with respect to the implementation manners and the application scope, modifications may be made by a person of ordinary skill in the art according to the idea of the present application. Therefore, this specification shall not be construed as a limitation on the present application.

What is claimed is:

1. A cache system, comprising a cache core server and a cache edge server, wherein:

the cache core server is deployed between a Packet Data Network Gateway of a core network and an application server, and the cache edge server is deployed in a radio access network;

the cache core server is configured to receive a request for a content from a user equipment device (UE) via a first Transmission Control Protocol (TCP) connection between the UE and the cache core server, forward the request to the application server, receive a response carrying information about the requested content from the application server, and, based on a determination according to the information about the requested content that the requested content has been cached in the cache core server, send the information about the requested content to the cache edge server;

the cache edge server is configured to determine whether the requested content is cached in the cache edge server according to the information about the requested content, acquire the requested content from the cache core server if the requested content is not cached in the cache edge server, and send a migrate-out request to the cache core server;

the cache core server is further configured to disable the first TCP connection, and send a migrate-out response comprising information about the first TCP connection to the cache edge server; and the cache edge server is further configured to establish a second TCP connection between the UE and the cache edge server according to the information about the first TCP connection comprised in the migrate-out response, and transfer the requested content to the UE via the second TCP connection.

2. The cache system according to claim 1, wherein the cache edge server is further configured to send a migrate-back request to the cache core server after transferring the requested content to the UE, the cache core server is further configured to restore the first TCP connection in response to the migrate-back request, and send a migrate-back response to the cache edge server; and the cache edge server is further configured to disable the second TCP connection.

3. The cache system according to claim 1, wherein in transferring the requested content to the UE via the second TCP connection, the cache edge server is configured to transfer a first part of the requested content to the UE via the second TCP connection, and transfer a second part of the requested content to the UE via another server when the UE moves to a signal range of the other server;

wherein the cache core server is further configured to receive an acknowledgment message from the other server, and send a migrate-back request to the cache edge server according to the acknowledgment message;

wherein the cache edge server is further configured to disable the second TCP connection, and send a migrate-back response to the cache core server; and wherein the cache core server is further configured to restore the first TCP connection in response to the migrate-back response.

4. A cache method performed by a cache core server deployed between a Packet Data Network Gateway of a core network and an application server, and a cache edge server deployed in a radio access network, comprising:

receiving, by the cache core server, a request for a content from a user equipment device (UE) via a first Transmission Control Protocol (TCP) connection between the UE and the cache core server;

forwarding, by the cache core server, the request to the application server;

receiving, by the cache core server, a response carrying information about the requested content from the application server;

sending, by the cache core server, information about the requested content to the cache edge server based on a determination according to the information about the requested content that the requested content has been cached in the cache core server;

determining by the cache edge server, whether the requested content is cached in the cache edge server according to the information about the requested content;

acquiring, by the cache edge server, the requested content from the cache core server if the requested content is not cached in the cache edge server;

sending, by the cache edge server, a migrate-out request to the cache core server;

disabling, by the cache core server, the first TCP connection;

sending, by the cache core server, a migrate-out response comprising information about the first TCP connection to the cache edge server;

establishing, by the cache edge server, a second TCP connection between the UE and the cache edge server according to the information about the first TCP connection comprised in the migrate-out response; and transferring, by the cache edge server, the requested content to the UE via the second TCP connection.

5. The cache method according to claim 4, further comprising:

after transferring the requested content to the UE, sending, by the cache edge server, a migrate-back request to the cache core server instructing the cache core server to restore the first TCP connection;

restoring, by the cache core server, the first TCP connection in response to the migrate-back request;

sending, by the cache core server, a migrate-back response to the cache edge server;

disabling, by the cache edge server, the second TCP connection.

6. The cache method according to claim 4, wherein transferring the requested content to the UE via the second TCP connection comprises:

transferring, by the cache edge server, a first part of the content to the UE via the second TCP connection; and transferring, by the cache edge server, a second part of the content to the UE via another server when the UE moves to a signal range of the other server;

receiving, by the cache core server, an acknowledgment message from the other server;

sending, by the cache core server, a migrate-back request to the cache edge server according to the acknowledgment message;

disabling, by the cache edge server, the second TCP connection;

sending, by the cache edge server, a migrate-back response to the cache core server; and restoring, by the cache core server, the first TCP connection in response to the migrate-back response.

* * * * *

UNITED STATES PATENT AND TRADEMARK OFFICE
CERTIFICATE OF CORRECTION

PATENT NO. : 10,630,530 B2
APPLICATION NO. : 15/632377
DATED : April 21, 2020
INVENTOR(S) : Yang et al.

Page 1 of 1

It is certified that error appears in the above-identified patent and that said Letters Patent is hereby corrected as shown below:

In the Claims

In Column 12, Claim 2, Line 50, rewrite "UE," as -- UE; --.

In Column 13, Claim 4, Line 25, rewrite "determining" as -- determining, --.

In Column 14, Claim 5, Line 16, rewrite "server;" as -- server; and --.

Signed and Sealed this
Twenty-seventh Day of September, 2022

Katherine Kelly Vidal
*Director of the United States Patent and Trademark Office*